(12) United States Patent  (10) Patent No.: US 8,161,015 B2
Kennedy et al.  (45) Date of Patent: Apr. 17, 2012

(54) METHOD AND SYSTEM FOR DEFERRED MAINTENANCE OF DATABASE INDEXES

(75) Inventors: John Paul Kennedy, Toronto (CA); Quanhua Hong, Toronto (CA); William T. O'Connell, Wheaton, IL (US); Leslie Anne Buback, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/083,973

(22) Filed: Apr. 11, 2011

(65) Prior Publication Data

US 2011/0184923 A1   Jul. 28, 2011

Related U.S. Application Data

(62) Division of application No. 11/278,125, filed on Mar. 30, 2006, now Pat. No. 7,945,543.

(51) Int. Cl.
　　G06F 7/00　　(2006.01)
　　G06F 17/00　(2006.01)
　　G06F 12/16　(2006.01)
　　G06F 17/30　(2006.01)
(52) U.S. Cl. ........................................ 707/696; 707/816
(58) Field of Classification Search .................. 707/696, 707/813, 816
See application file for complete search history.

(56) References Cited

U.S. PATENT DOCUMENTS

| | | | |
|---|---|---|---|
| 5,551,027 A | 8/1996 | Choy et al. | |
| 5,765,168 A | 6/1998 | Burrows | |
| 5,842,196 A | 11/1998 | Agarwal et al. | |
| 5,960,194 A | 9/1999 | Choy et al. | |
| 6,026,412 A | 2/2000 | Sockut et al. | |
| 6,272,502 B1 | 8/2001 | Lieuwen et al. | |
| 6,363,387 B1 | 3/2002 | Ponnekanti et al. | |
| 6,374,263 B1 | 4/2002 | Bunger et al. | |
| 6,411,964 B1 | 6/2002 | Iyer et al. | |
| 6,438,562 B1 | 8/2002 | Gupta et al. | |
| 6,721,739 B1 | 4/2004 | Mende, Jr. et al. | |
| 7,181,453 B2 | 2/2007 | Ronstrom | |
| 7,263,536 B1 | 8/2007 | Peterson | |
| 7,308,456 B2 | 12/2007 | Friske et al. | |
| 7,490,084 B2 | 2/2009 | Kothuri et al. | |
| 2005/0091180 A1 | 4/2005 | Peleg et al. | |

OTHER PUBLICATIONS

Dan Hotka, A Closer Look at Oracle8i Data Blcok Internals, Published Feb. 9, 2011, pp. 1-8. www.informit.com.

*Primary Examiner* — James Trujillo
*Assistant Examiner* — Jeffrey A Burke
(74) *Attorney, Agent, or Firm* — Sughrue Mion, PLLC (57) ABSTRACT

Rectifying discrepancies between a table, from which a segment of data has been removed, and an index for the table may be deferred. Each entry in the index is sequentially analyzed to remove entries therefrom referring to any removed segment referenced in the starting location list. During this process, if a segment newly removed from the table is detected, then analysis of the index entries continues and an indicator is set that another segment has been removed. Analysis of the entries continues in a looping fashion until each entry has been assessed to determine if it makes a reference to any of the removed segments. If a query is received before rectification is complete then the query is amended by establishing search boundaries based so that the query does not produce any entries in the index referring to removed segments.

13 Claims, 6 Drawing Sheets

METHOD AND SYSTEM FOR DEFERRED MAINTENANCE OF DATABASE INDEXES

CROSS-REFERENCE TO RELATED APPLICATIONS

This application is a divisional application of U.S. application Ser. No. 11/278,125 filed Mar. 30, 2006; the entire disclosure which is incorporated herein by reference in its entirety.

FIELD OF THE INVENTION

The present invention relates to maintenance of database indexes, and more particularly to deferred maintenance of database indexes.

BACKGROUND OF THE INVENTION

In a typical data warehouse environment, the large amounts of data stored in databases may be organized into segments of data, where each segment contains all data in a table having an identified characteristic (e.g. all sales data for a particular month of a particular year). Segments may be occasionally removed from the table either for further processing or because the data in the segment is no longer needed. The removal of a segment from the table may involve removal of a large amount of data. Even if the table is not organized into segments and all data having an identified characteristic is removed, the index for the table should be updated as a result of such a removal.

One method for maintaining indexes combines index maintenance with a data removal operation. However, given the large amount of data involved in a removal operation, such index maintenance impedes removal operation progress if they are performed concurrently. Another method requires that an entirely new index be built after the removal operation is completed, but this may result in more work than is necessary if the index is largely correct.

SUMMARY OF THE INVENTION

Rectifying discrepancies between a table, from which a segment of data has been removed, and an index for the table may be deferred. Each entry in the index is sequentially analyzed to remove entries therefrom referring to any removed segment referenced in the starting location list. During this process, if a segment newly removed from the table is detected, then analysis of the index entries continues and an indicator is set that another segment has been removed. Analysis of the entries continues in a looping fashion until each entry has been assessed to determine if it makes a reference to any of the removed segments. If a query is received before rectification is complete then the query is amended by establishing search boundaries based so that the query does not produce any entries in the index referring to removed segments.

Certain embodiments can provide a method of performing a query using an index for a table having a segment of data removed therefrom, the index being discrepant from the table, said method comprising: amending the query according to discrepancies between the table and the index, the step of amending comprising: establishing search boundaries based on entries in the index referring to the removed segment; and generating a search of the index within the search boundaries based on the query; rectifying the discrepancies between the index and the table, the step of rectifying comprising: establishing an entry in a starting location list for the removed segment, the entry in the starting location list corresponding to an entry in the index; sequentially analyzing, from the starting location list, each entry in the index to remove entries from the index referring to any removed segment referenced in the starting location list; detecting a segment newly removed from the table; setting an entry in the starting location list for the newly removed segment corresponding to a next unanalyzed entry in the index; and continuing the steps of sequentially analyzing, detecting and setting until all entries in the index have been analyzed for each removed segment referenced in the starting location list.

Certain embodiments can provide a method of rectifying discrepancies between a table from which a segment of data has been removed and an index for the table, said method comprising: a) establishing an entry in a starting location list for the removed segment, the entry in the starting location list corresponding to an entry in the index; b) sequentially analyzing, from the starting location list, each entry in the index to remove entries from the index referring to any removed segment referenced in the starting location list; c) detecting a segment newly removed from the table; d) setting an entry in the starting location list for the newly removed segment corresponding to a next unanalyzed entry in the index; and e) continuing steps b) to d) until all entries in the index have been analyzed for each removed segment referenced in the starting location list.

Certain embodiments can provide a system for performing a query using an index for a table having a segment of data removed therefrom, the index being discrepant from the table, said system comprising: a query amend component for amending the query according discrepancies between the table and the index, the query amend component comprising: a boundary component for establishing search boundaries based on entries in the index referring to the removed segment; and a search component for generating a search of the index within the search boundaries based on the query; a maintenance component for rectifying the discrepancies between the index and the table, the maintenance component comprising: a starting component for establishing an entry in a starting location list for the removed segment, the entry in the starting location list corresponding to an entry in the index; a new data component for detecting a segment newly removed from the table and setting an entry in the starting location list for the newly removed segment corresponding to a next unanalyzed entry in the index; and a removal information component for sequentially analyzing each entry in the index to remove entries from the index referring to any removed segment referenced in the starting location list until all entries in the index have been analyzed for each removed segment referenced in the starting location list; wherein the query amend component and the maintenance component may process the index simultaneously.

Certain embodiments can provide a system for rectifying discrepancies between a table from which a segment of data has been removed and an index for the table, said system comprising: a starting component for establishing an entry in a starting location list for the removed segment, the entry in the starting location list corresponding to an entry in the index; a new data component for detecting a segment newly removed from the table and setting an entry in the starting location list for the newly removed segment corresponding to a next unanalyzed entry in the index; and a removal information component for sequentially analyzing each entry in the index to remove entries from the index referring to any removed segment referenced in the starting location list until all entries in the index have been analyzed for each removed segment referenced in the starting location list;

Certain embodiments can provide a computer readable medium having stored thereon computer-executable instructions for a query using an index for a table having a segment of data removed therefrom, the index being discrepant from the table, the computer-executable instructions implementing the steps comprising: amending the query according to discrepancies between the table and the index, the step of amending comprising: establishing search boundaries based on entries in the index referring to the removed segment; and generating a search of the index within the search boundaries based on the query; rectifying the discrepancies between the index and the table, the step of rectifying comprising: establishing an entry in a starting location list for the removed segment, the entry in the starting location list corresponding to an entry in the index; sequentially analyzing, from the starting location list, each entry in the index to remove entries from the index referring to any removed segment referenced in the starting location list; detecting a segment newly removed from the table; setting an entry in the starting location list for the newly removed segment corresponding to a next unanalyzed entry in the index; and continuing the steps of sequentially analyzing, detecting and setting until all entries in the index have been analyzed for each removed segment referenced in the starting location list.

Certain embodiments can provide a computer readable medium having stored thereon computer-executable instructions for rectifying discrepancies between a table from which a segment of data has been removed and an index for the table, the computer-executable instructions implementing the steps comprising: a) establishing an entry in a starting location list for the removed segment, the entry in the starting location list corresponding to an entry in the index; b) sequentially analyzing, from the starting location list, each entry in the index to remove entries from the index referring to any removed segment referenced in the starting location list; c) detecting a segment newly removed from the table; d) setting an entry in the starting location list for the newly removed segment corresponding to a next unanalyzed entry in the index; and e) continuing steps b) to d) until all entries in the index have been analyzed for each removed segment referenced in the starting location list.

BRIEF DESCRIPTION OF THE DRAWINGS

The present invention will be described in conjunction with the drawings in which.

DETAILED DESCRIPTION

The following detailed description of the embodiments does not limit the implementation of the embodiments to any particular computer programming language. The present invention can also be embedded in a computer readable medium, such as a computer program product or a propagated signal bearing computer-executable instructions, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The computer readable medium may be implemented in any computer programming language provided that the operating system provides the facilities that support the requirements of the computer program product. An embodiment may be implemented in the C or C++ computer programming language (or may be implemented in other computer programming languages in conjunction with C/C++) or a database language such as Structured Query Language (SQL), for example. Any limitations presented would be a result of a particular type of operating system, computer programming language, or data processing system and would not be a limitation of the embodiments described herein.

Figure 1:
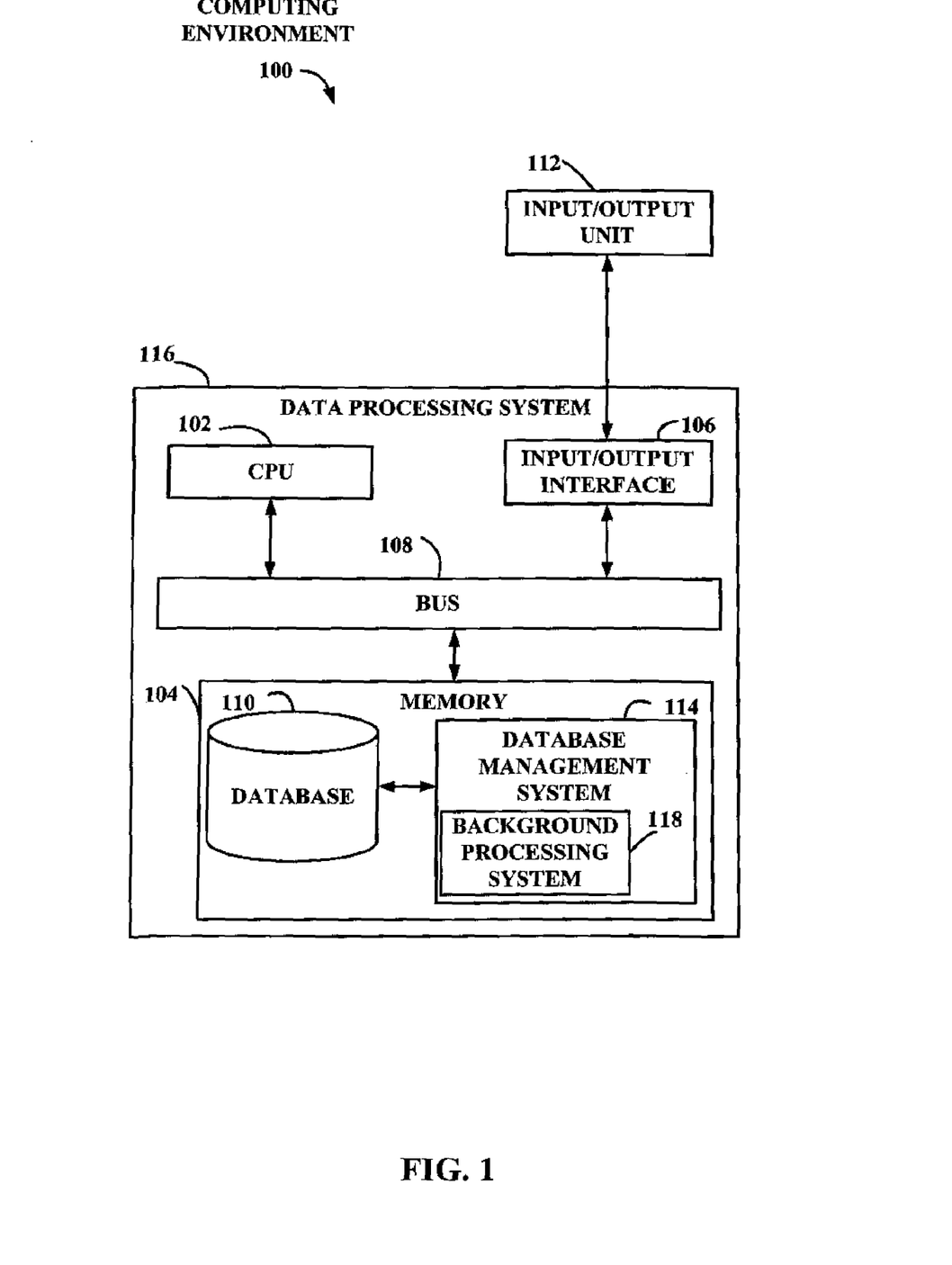
FIG. 1 is an exemplary database management system (DBMS)

FIG. 1 illustrates a configuration of a computing environment 100 comprising a data processing system 116 in which an embodiment of a database management system (DBMS) 114 may be implemented.

The data processing system 116 includes a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112 in the computing environment 100.

The CPU 102 can be a commercially available CPU or a customized CPU suitable for operations described herein. Other variations of the CPU 102 can include a plurality of CPUs interconnected to coordinate various operations and functions. The data processing system 116 may serve as an apparatus for performing the present method through execution by the CPU 102.

The memory 104 includes the DBMS 114 and a database 110. The DBMS 114 comprises a background processing system 118.

Certain embodiments may be manifested in the background processing system 118. Alternatively, embodiments may be provided as an extension of the functionality of the DBMS 114. Embodiments may be realized in a program stored in, for example, the memory 104. Alternatively, embodiments may be recorded on any type of recording medium such as a magnetic disk or an optical disk. Embodiments recorded on such a recording medium are loaded into the memory 104 of the data processing system 116 via the input/output unit 112 (e.g. a disk drive).

Figure 2:
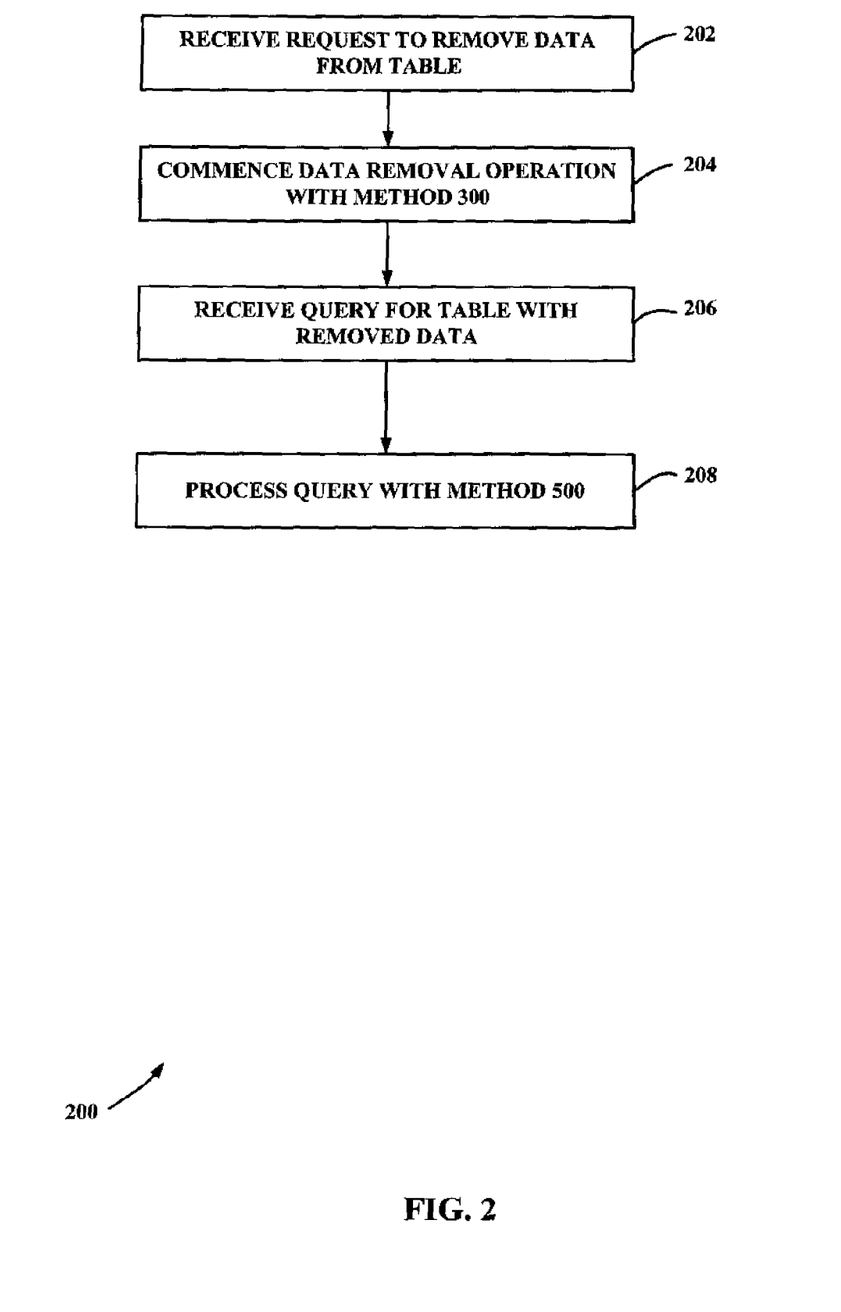
FIG. 2 illustrates a method of performing a received query on a table for which maintenance on an index is deferred.
Figure 3:
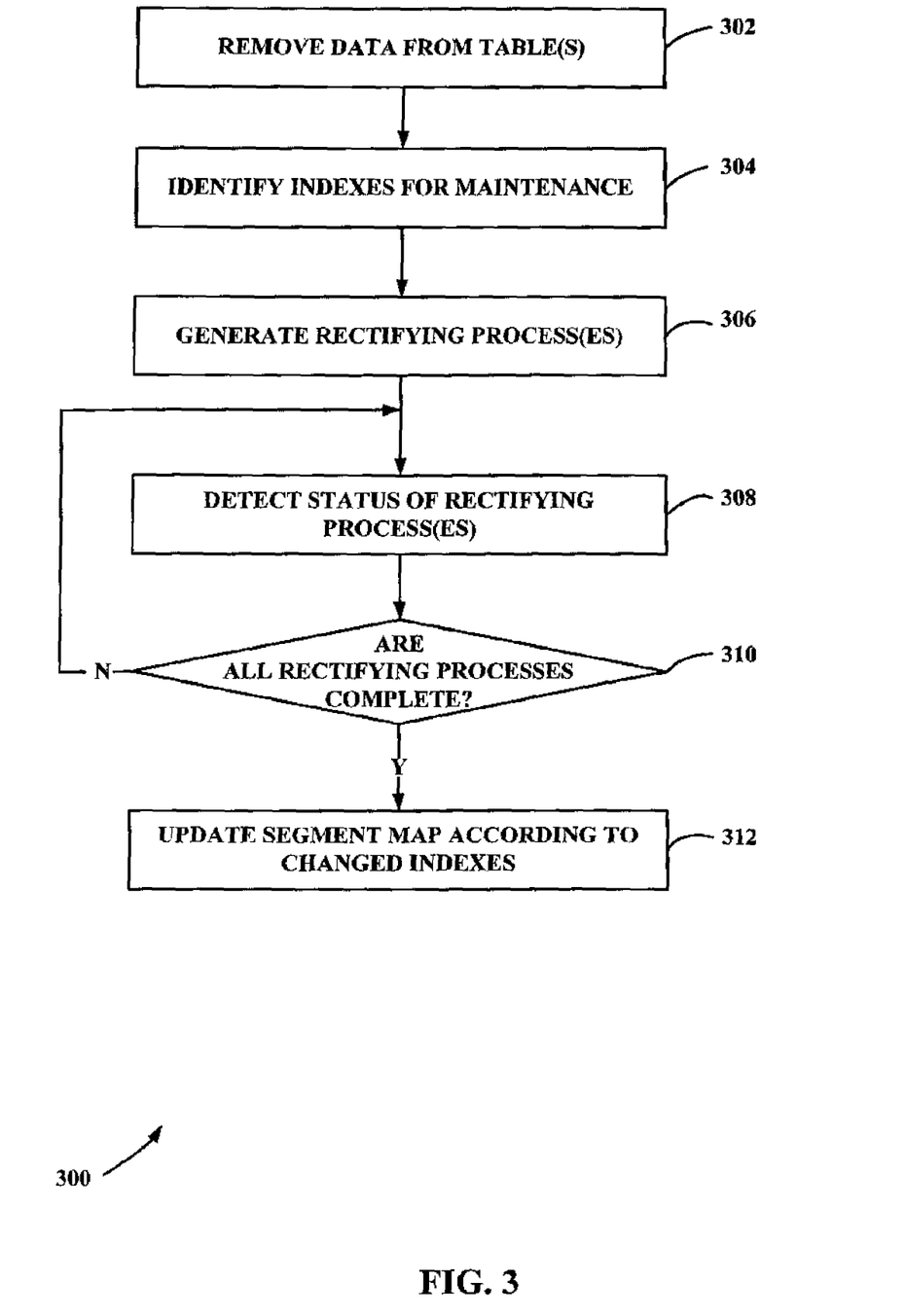
FIG. 3 illustrates a deferred index maintenance method of a background processing system of the DBMS of FIG. 1.
Figure 4:
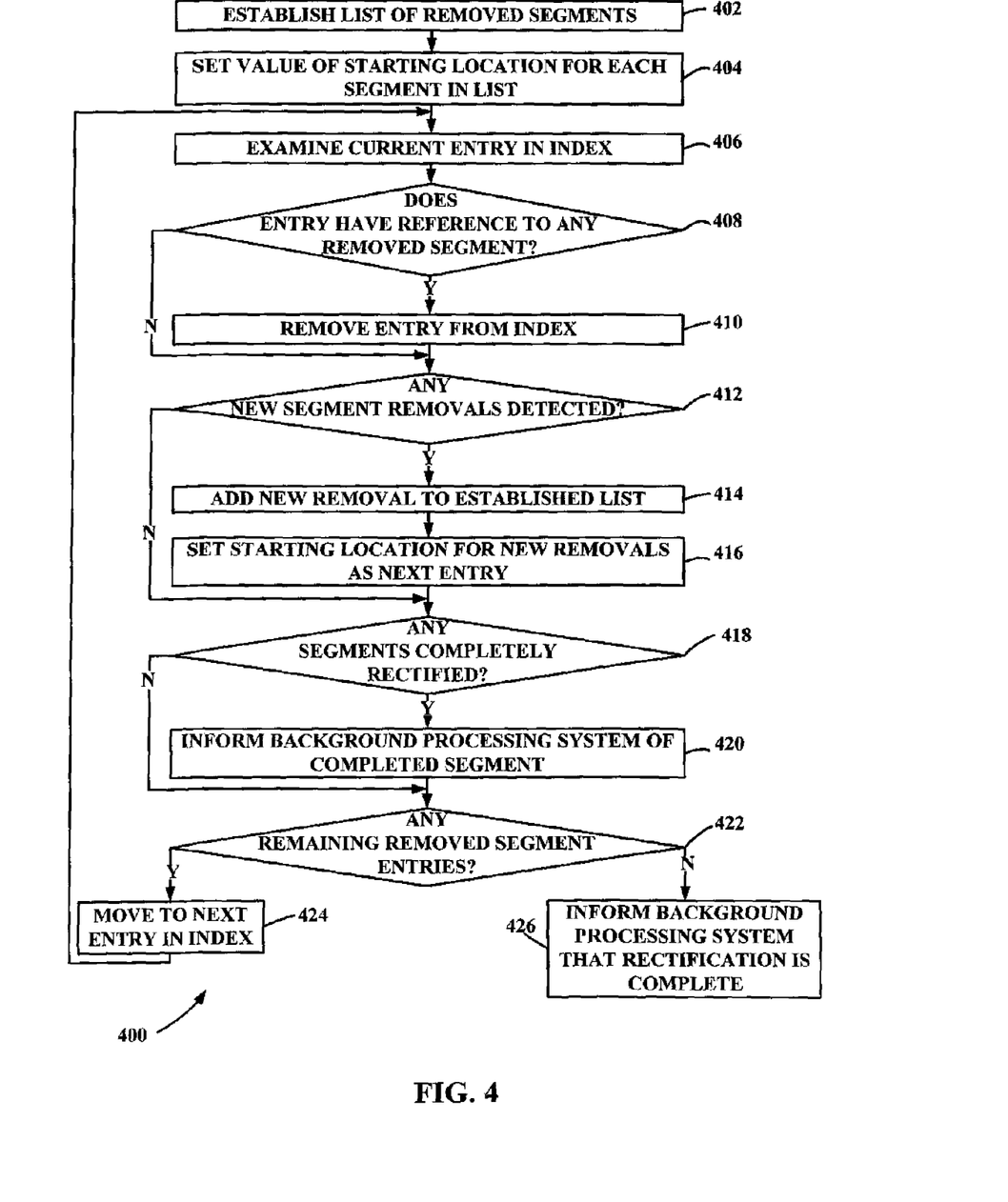
FIG. 4 illustrates a flow of a method for rectifying database indexes of the background processing system.

FIG. 2 illustrates a method 200 of performing a received query for a table having an index for which maintenance has been deferred. A request to remove data from the table is received in step 202. The data removal operation (methods 300, 400) illustrated in FIGS. 3 and 4 is started in step 204. The data removal operation includes removing the data from the table and also rectifying discrepancies between the table (with the removed data) and any indexes for the table.

A query is received for the table from which data has been removed in step 206. The query may search through the index for the table to locate information in the table satisfying criteria of the query. At the time that the query is received, the index may not have been rectified to reflect the removal of the data. Thus, if the query is executed on the index then some of the results may not be for valid data. Thus, the query is amended before execution in step 208 as illustrate in method 500 of FIG. 5. Steps 204 and 208 may be performed concurrently in the case where a query is received at the time that an index is being maintained.

FIG. 3 illustrates an index maintenance method 300 of the background processing system 118 in the DBMS 114. The database 110 contains tables storing the data, each of which may have at least one index providing location information for data in the table. If the table is organized into segments then each entry in the index may indicate the location in the database 110 of the data corresponding to the entry and make reference to segment(s) to which the data belongs. If the table is segmented then there is a list in the database 110 of all of the segments contained in the table. The database 110 includes a segment map providing an overview of the contents of the database 110. The segment map lists all tables in the database 110 as well as the segments in each table and their status (e.g. attached, detached, awaiting maintenance, etc.).

Data is removed from table(s) in the database in step 302. The data removed may be entire segment(s) from a segmented table(s) or all data having identified characteristics from an unsegmented table. The data removed from the table(s) may be placed in another table or deleted. If the table is segmented then a list of segments for the table will be amended to reflect that the segment(s) have been removed.

When the data is removed from the table(s), the corresponding indexes for the table(s) are not automatically or immediately updated. At the time that the data is removed, a message is provided to the background processing system 118 that indicates that maintenance is to be performed on indexes. The message provides the background processing system 118 with an indication that maintenance is to be performed, those indexes that are to be updated and the segments that have been removed. The background processing system 118 may retain a list of all such indexes that are mentioned in each message to perform the maintenance at preset intervals or maintenance on each identified index may commence after the message is received and the data removal operation has been committed. If a message to perform index maintenance is received while maintenance on that index is currently being performed then the component performing such maintenance will be informed of such additional changes and may act accordingly as will be described in further detail below.

The indexes on which maintenance is to be performed are identified in step 304. Such identification can be obtained from the list of indexes on which maintenance is to be performed that is retained by the background processing system 118 (in the case where maintenance is performed at preset intervals) or from the message that prompted the background processing system 118 to being index maintenance.

A rectifying process is generated in step 306 for each index that is to be maintained to rectify discrepancies resulting from data removal. The database 110 may have multiple indexes, each of which may have multiple segments removed therefrom. A rectifying process may be generated for each removed segment. Alternatively, to consolidate the rectifying processes, a single rectifying process may be generated for each index to rectify all discrepancies in that index resulting from the removal of multiple segments. A single rectifying process may also be generated to perform maintenance on every identified index. In the case of a single rectifying process, maintenance on each index may be performed serially.

Each rectifying process periodically provides the background processing system 118 with a status of its progress. Each rectifying process may also inform the background processing system 118 when rectification of each segment being processed thereby is complete. The background processing system 118 detects the status of all of the rectifying processes in step 308 to determine if they are complete in step 310. If the rectifying processes have not completed then the background maintenance system 118 continues to detect the status and determine if the processes are complete (steps 308 and 310) until such a time as all rectifying processes have completed.

After the rectifying processes have finished, the database segment map is updated to reflect the changes in the data object references in step 312. The segment map provides an overview of the database 110 and lists all of the tables therein along with all of the segments that compose each table and the status of those segments. The segment map is updated by removing the reference to the removed segments therefrom.

FIG. 4 illustrates a method 400 for rectifying the database index activated by the index maintenance method 300. A list of the removed segments for the index that is currently being rectified is established in step 402. This list may be provided to the rectification process upon generation. This list may also be obtained from the background processing system 118 where the message to perform maintenance and all information provided with the message are retained.

Each of the removed segments also has a starting location associated with it. A value for the starting location for each segment in the list is set in step 404. Since the rectification process has not yet started scanning the index by this point, the value for the starting location will be set to the first entry that is being examined by the rectification process, generally the first entry in the index.

Each entry is examined in step 406 to determine if the entry has a reference to any removed segment in step 408. If the entry does have a reference to any removed segment (as identified in the list of removed segments) then the entry is removed from the index in step 410.

If the entry has no reference to any removed segment, or has already been removed, then a detection of new removals in the table associated with the index is made in step 412. In this case a new removal is any segment that was removed after the list of removed segments was established in step 402, or any segment that was removed at such a time so as not to be incorporated into the list. Detection of newly removed segments may be done upon receiving a message from the background processing system 118 indicating a newly removed segment or periodic checking of the messages received by the background processing system 118. The rectification process may also examine the list of segments in the table to determine if there are any additional segments that have a state indicating that they have been removed.

If a newly removed segment is detected then this segment is added to the list in step 414. A starting location having the value of the next entry in the index to be examined is associated with the newly removed segment in step 416. By setting such a starting location value, the index maintenance may continue taking into consideration the newly removed segment without being restarted and can loop around after the index has been examined once completely to restart and continue until examination of entries in the index reaches this new starting location. In this manner, the entire index is examined for each removed segment regardless of when the scan started for that removed segment.

After the new segment is added to the list, or if there were no new segments, then it is determined in step 418 if the index has been rectified for any segment. This may be determined by looking at the next entry in the index and determining if there is a match with the starting location for any of the segments in the list other than the newly removed segment. If rectification for a segment is complete then the background processing system is informed of such completion in step 420.

After the background processing system 118 has been information of the segment rectification complete, or if no segments have been completed, the remaining entries in the index are processed (steps 406 to 424) if not all remaining entries have been processed in step 422. Whether there are remaining entries to be examined is determined according to the last starting location for the segments. If the current segment is the segment before the last starting location then all segments have been processed. The last starting location is used so that examination of the entries loops around to repeat any entries that were not processed for the newly removed segments. If there are entries still to be examined then the process moves to the next entry in steps 424 and steps 406 to 422 continue.

After all segments have been processed, the background processing system 118 is informed that the rectification process is complete in step 426.

Figure 5:
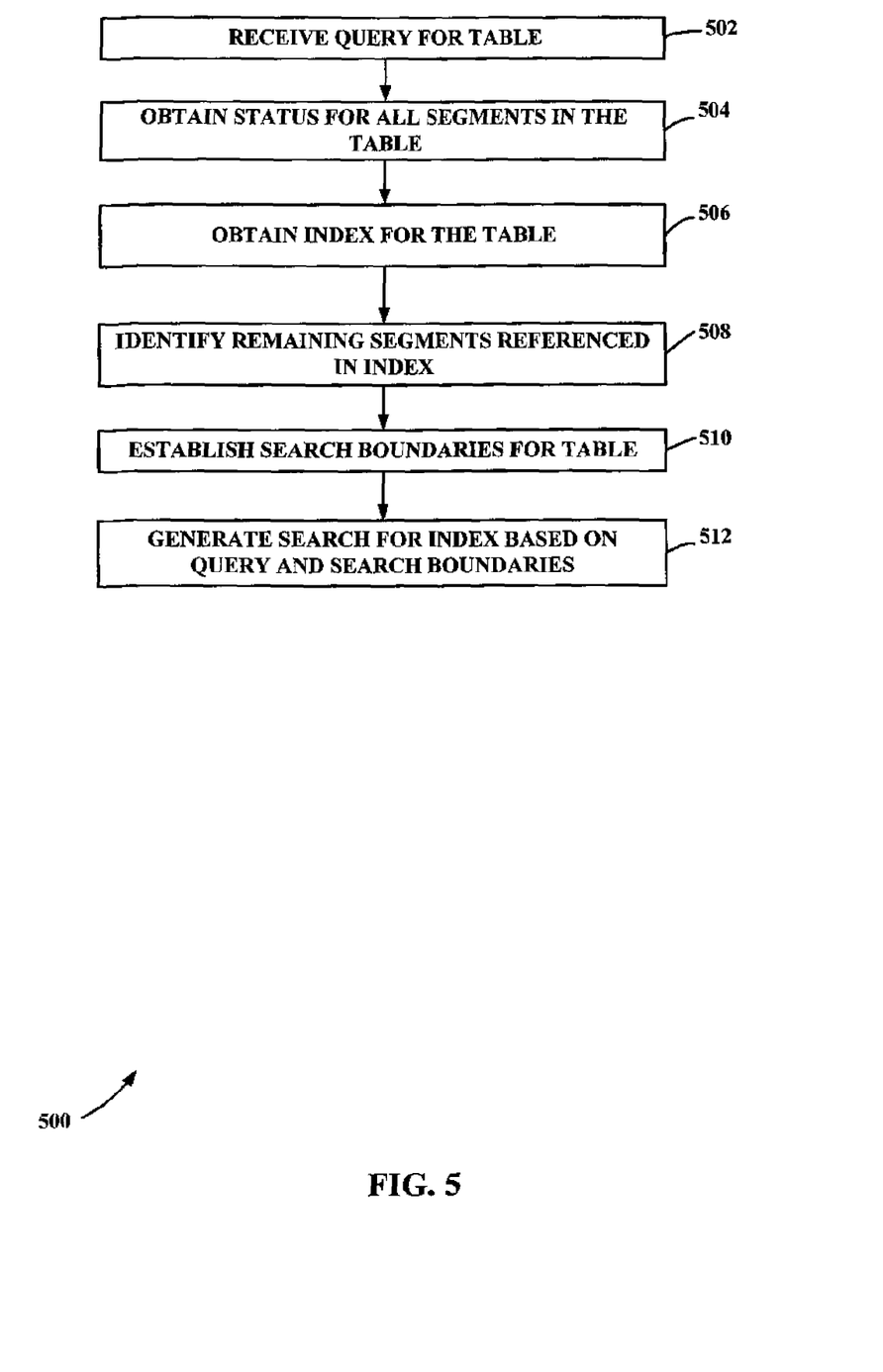
FIG. 5 illustrates a flow of a method for processing an amended query for an unrectified index of the DBMS.

FIG. 5 illustrates a flow of a method 500 for processing a query for an unrectified index. For the intervening period between when the data is removed from the table and when maintenance is performed to rectify discrepancies resulting from such removal, reference to the removed data remains in the index. Since maintenance of the index may be deferred, queries on the table which rely on the index may be submitted while removed data is still referenced in the index. To enable the query to provide only valid data, boundaries for parts of the table that can be searched are made.

A query for a table from which data has been removed is received in step 502. In this case, the received query uses an index to obtain results. The index for the table is obtained in step 504. The index may not have been updated to reflect that data has been removed from the table, thus, there may be entries in the index that are not valid.

The status for all segments in the table is obtained in step 506. The status may be obtained from the list of all segments in the table or from the segment map for the database, which also retains the status of each segment. Those segments that have been removed from the table are identified in the index in step 508 based on the obtained status for the segments or messages stored in the background processing system 118.

Search boundaries for the table are established in step 510. These search boundaries are based on the segments that remain in the table. Thus, the search boundaries may be established such that an entry in the index containing a reference to a removed segment is excluded from the portions of the index that are being searched. Such boundaries may provide positive limitations setting out those sections of the index that may be searched or negative limitations setting out those sections of the index that may not be searched.

A search for the index is generated in step 512 using the search boundaries to set what will be searched and the query to set the criteria for the search. Since only the portions of the index indicated in the search boundaries will be searched, those entries in the index that refer to segments that have been removed will be skipped during the search.

An alternative to the method above is to determine the status of each segment that an entry in the index refers to upon encountering the entry during execution of the query.

Figure 6:
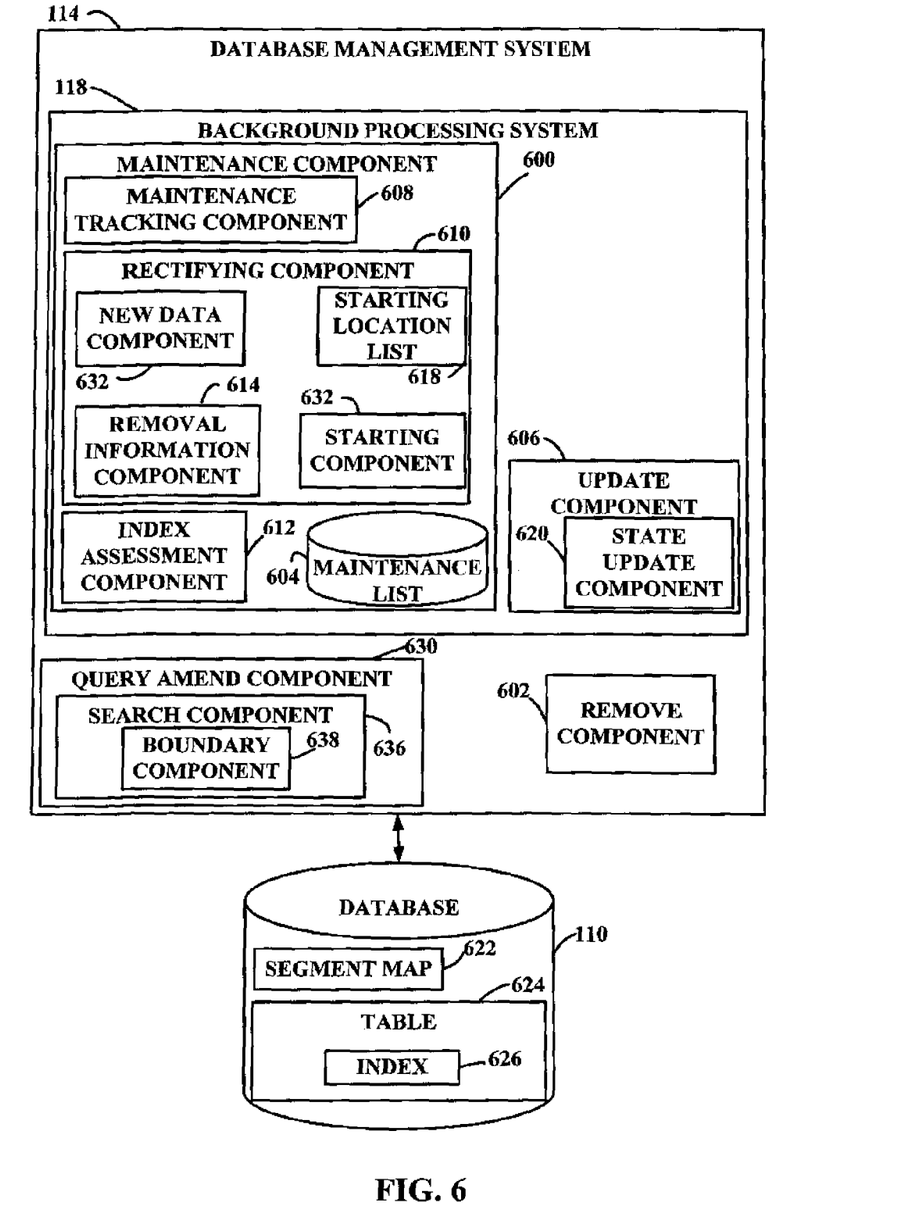
FIG. 6 illustrates functional components of the DBMS and the background processing system for deferred index maintenance.

FIG. 6 illustrates functional components in the background processing system 118 for deferred index maintenance. The database management system 118 is in communication with the database 110. The database includes a table 624 storing data, an index 626 associated with the table 624 indicating locations in the table 624 in which data is stored, and a segment map 622 indicating which tables and their associated segments (including status) are stored in the database 110.

The DBMS 114 includes a query amend component 630 having a search component 636 with a boundary component 638, all of which function together to enable a query to be performed against the index 626 before entries referring to removed segments have been removed from the index 626. The query amend component 630 receives a query that is to be performed against the table 624. The query amend component 630 identifies the removed segments either from the segment map 622 or through the background processing system 118.

The search component 636 forms a search of only the part of the index 626 that do not make reference to removed segments. The boundary component 638 identifies all entries in the index 626 that make reference to removed segments and forms boundaries for the search so that entries referring to removed segments are ignored by the search. Using the search boundaries, the search component 636 generates a search of the valid entries in the index 626 looking for characteristics identified in the received query. These search boundaries may set out either those portions of the index that can be searched or those portions of the index that cannot be searched.

The remove component 602 removes data from the table 624. The data removed is either an entire segment of data or a group of data having an identified characteristic. If the data removed is a segment, then the status of the segment in the segment list 628 is set by the remove component 602 to indicate that the segment has been detached from the table 624 and in the segment map 622 to indicate that the segment is in need of rectification.

When the data is removed from the table 624, the remove component 602 sends a message to the background processing system 118 to indicate that the index for the table from which the segment was removed should be updated.

The background processing system 118 includes a maintenance component 600, and an update component 606, all of which function together to provide deferred maintenance of the index 626.

The maintenance component 600 contains a maintenance tracking component 608, an index assessment component 612 and a rectifying component 610 and a maintenance list 604 which function together to rectify the discrepancies between the data in the table 624 and the index 626. The maintenance tracking component 608 coordinates the removal operation.

Any messages received from the remove component 602 are stored in the maintenance list 604. The maintenance list 604 indicates that an index is to be maintained and may indicate which segments have been removed and which indexes are to be maintained.

The index assessment component 612 determines which indexes are to be maintained to rectify discrepancies.

The rectifying component 610 processes a given index to rectify any discrepancies therein. Multiple copies of the rectifying component 610 may be present, either generated by the maintenance tracking component 608 or coordinated thereby to process one or more indexes. The maintenance tracking component 608 informs each copy of the rectifying component 610 of the index that it will process.

The rectifying component 610 includes a removal information component 614, a new data component 632, and a starting location list 618. Upon receiving the information on the index that is to be processed, the rectifying component 610 initializes the starting location list 618. There is a value in the starting location list 618 for each segment in the maintenance list 604 to indicate the first entry in the index 626 that was examined to determine is there was a reference to the segment.

The removal information component 614 examines each entry in the index to determine if it makes reference to any of the segments in the maintenance list 604. If such a reference is made then the entry is removed from the index.

The new data component 632 examines the maintenance list 604 or the segment map 622 on a periodic basis to determine if there are any new segments indicated therein that are in the table 624 for which the index 626 is being rectified. If it is determined that a segment from the table 624 has been removed after the rectifying component 610 began the removal process, then a new entry for the segment is added to the maintenance list 604 and the starting location list 618 for this segment is indicated as being the next entry to be examined in the index 626. After the first pass of all entries in the index has complete, the removal information component 614 will continue until the entry before the starting location list 618 for the most recently added segment to the maintenance list 604 is processed. In this manner, index maintenance can continue each time a new segment is removed without the entire operation restarting.

The update component 606 updates the segment map 622 to reflect the removal of the segment and includes a state update component 620. The update component 606 removes the reference to the removed segment from the segment map 622. The state update component 620 updates the state of the removed segment in the segment map 604. While the process of removing the segment, and rectifying the index 626, is being performed, the state of the segment will indicate that maintenance is being performed. After the removal operation, the state update component 620 removes the segment from the segment map 604.

The table 624 in the database 110 may take any of a number of different forms, including but not limited to, a data partitioned table in which the segments are partitions, a multidimensional clustering table in which the segments are blocks, and an unorganized table in which the table includes groups of data having an identified characteristic. In the case of an unorganized table, a list of all data having the identified characteristic may be created to assist in removal of the data, rectifying the index and amending the query.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, as mentioned earlier, the invention can take the form of a computer program product. The computer program product is accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As illustrated earlier, a data processing system suitable for storing and/or executing program code will include at least one processor coupled directly or indirectly to memory elements, possibly through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is apparent to one skilled in the art that numerous modifications and departures from the specific embodiments described herein may be made without departing from the spirit and scope of the invention.

What is claimed is:

1. A method of performing a query using an index for a table having a segment of data removed therefrom, the index being discrepant from the table, said method comprising:
   amending the query according to discrepancies between the table and the index, the step of amending comprising:
      establishing search boundaries based on entries in the index referring to the removed segment; and
      generating a search of the index within the search boundaries based on the query;
   rectifying the discrepancies between the index and the table, the step of rectifying comprising:
      establishing an entry in a starting location list for the removed segment, the entry in the starting location list corresponding to an entry in the index;
      sequentially analyzing, from the starting location list, each entry in the index to remove entries from the index referring to any removed segment referenced in the starting location list;
      detecting a segment newly removed from the table;
      setting an entry in the starting location list for the newly removed segment corresponding to a next unanalyzed entry in the index; and
      continuing the steps of sequentially analyzing, detecting and setting until all entries in the index have been analyzed for each removed segment referenced in the starting location list.

2. The method of claim 1, wherein the steps of amending and rectifying are performed simultaneously.

3. The method of claim 1, wherein the step of establishing search boundaries comprises:
   constructing search boundaries indicating entries in the index that make no reference to the removed segment that will be searched for the query.

4. The method of claim 1 wherein the steps of detecting and setting are performed concurrently with the step of sequentially analyzing.

5. The method of claim 1 wherein the step of rectifying further comprises:

updating a segment map of the database indicating tables and segments in the database to reflect removal of the removed segment and the newly removed segment from the table.

6. A system for performing a query using an index for a table having a segment of data removed therefrom, the index being discrepant from the table, said system comprising:
 a query amend component for amending the query according discrepancies between the table and the index, the query amend component comprising:
  a boundary component for establishing search boundaries based on entries in the index referring to the removed segment; and
  a search component for generating a search of the index within the search boundaries based on the query;
 a maintenance component for rectifying the discrepancies between the index and the table, the maintenance component comprising:
  a starting component for establishing an entry in a starting location list for the removed segment, the entry in the starting location list corresponding to an entry in the index;
  a new data component for detecting a segment newly removed from the table and setting an entry in the starting location list for the newly removed segment corresponding to a next unanalyzed entry in the index; and
  a removal information component for sequentially analyzing each entry in the index to remove entries from the index referring to any removed segment referenced in the starting location list until all entries in the index have been analyzed for each removed segment referenced in the starting location list;
 wherein the query amend component and the maintenance component may process the index simultaneously.

7. The system of claim 6, wherein the search boundaries are established to exclude entries in the index referring to the removed segment from entries in the index that will be searched for the query.

8. The system of claim 6, further comprising:
 an update component for updating a segment map of the database indicating tables and segments in the database to reflect removal of the removed segment and the newly removed segment from the table.

9. A computer program product comprising a computer readable storage medium bearing computer-executable instructions for a query using an index for a table having a segment of data removed therefrom, the index being discrepant from the table, the computer-executable instructions implementing the steps comprising:
 amending the query according to discrepancies between the table and the index, the step of amending comprising:
  establishing search boundaries based on entries in the index referring to the removed segment; and
  generating a search of the index within the search boundaries based on the query; rectifying the discrepancies between the index and the table, the step of rectifying comprising:
  establishing an entry in a starting location list for the removed segment, the entry in the starting location list corresponding to an entry in the index;
  sequentially analyzing, from the starting location list, each entry in the index to remove entries from the index referring to any removed segment referenced in the starting location list;
  detecting a segment newly removed from the table;
  setting an entry in the starting location list for the newly removed segment corresponding to a next unanalyzed entry in the index; and
  continuing the steps of sequentially analyzing, detecting and setting until all entries in the index have been analyzed for each removed segment referenced in the starting location list.

10. The computer executable instructions of claim 9, wherein the steps of amending and rectifying are performed simultaneously.

11. The computer program product of claim 9, wherein the step of establishing search boundaries comprises:
 constructing search boundaries indicating entries in the index that make no reference to the removed segment that will be searched for the query.

12. The computer executable instructions of claim 9, wherein the steps of detecting and setting are performed concurrently with the step of sequentially analyzing.

13. The computer program product of claim 9, wherein the step of rectifying further comprises:
 updating a segment map of the database indicating tables and segments in the database to reflect removal of the removed segment and the newly removed segment from the table.

* * * * *